(12) United States Patent
Kuznetsov et al.

(10) Patent No.: US 9,141,354 B2
(45) Date of Patent: Sep. 22, 2015

(54) ADVANTAGEOUS STATE MERGING DURING SYMBOLIC ANALYSIS

(75) Inventors: Volodymyr Kuznetsov, Renens (CH);
Johannes Kinder, Lausanne (CH);
Stefan Bucur, Lausanne (CH); George Candea, Saint-Sulpice (CH)

(73) Assignee: Ecole Polytechnique Fédérale de Lausanne (EPFL), Lausanne (CH)

( * ) Notice: Subject to any disclaimer, the term of this patent is extended or adjusted under 35 U.S.C. 154(b) by 628 days.

(21) Appl. No.: 13/453,973

(22) Filed: Apr. 23, 2012

(65) Prior Publication Data
US 2013/0283236 A1   Oct. 24, 2013

(51) Int. Cl.
G06F 9/44 (2006.01)
G06F 9/45 (2006.01)

(52) U.S. Cl.
CPC ....................................... *G06F 8/42* (2013.01)

(58) Field of Classification Search
CPC .... G06F 11/3688; G06F 11/3664; G06F 8/42
USPC .......................................... 717/124, 126, 140
See application file for complete search history.

(56) References Cited

U.S. PATENT DOCUMENTS

| | | | | |
|---|---|---|---|---|
| 8,302,086 | B2 * | 10/2012 | Li et al. | 717/154 |
| 2003/0226060 | A1 * | 12/2003 | Das et al. | 714/38 |
| 2005/0060691 | A1 * | 3/2005 | Das et al. | 717/132 |
| 2011/0320767 | A1 * | 12/2011 | Eren et al. | 712/30 |
| 2012/0174064 | A1 * | 7/2012 | Polly et al. | 717/120 |
| 2012/0311535 | A1 * | 12/2012 | Fanning et al. | 717/123 |

OTHER PUBLICATIONS

Hansen et al. "State joining and splitting for symbolic execution of binaries. " Intl. Conf on Runtime Verification, 2009.*
Anand, S. et al., "Demand-Driven Compositional Symbolic Execution," In *Intl. Conf. on Tools and Algorithms for the Construction and Analysis of Systems*, 2008, 19 pages.
Babic, D. et al., "Calysto: scalable and precise extended static checking," In *30th Intl. Conf. on Software Engineering*, 2008, pp. 211-220.
Boonstoppel, P. et al., "RWset: Attacking path explosion in constraint-based test generation," In *Intl. Conf. on Tools and Algorithms for the Construction and Analysis of Systems*, 2008, pp. 351-366.

(Continued)

*Primary Examiner* — Li B Zhen
*Assistant Examiner* — Viva Miller
(74) *Attorney, Agent, or Firm* — Fenwick & West LLP

(57) ABSTRACT

A determination is made regarding whether to merge two symbolic analysis states. A first state corresponds to a first path through a program to a program location and a second state corresponds to a second path through the program to the program location. A set of variables of the program at the program location is determined. For each variable in the set: a) a first value of the variable in the first state is determined; b) a second value of the variable in the second state is determined; and c) a determination is made, based on the first and second values, regarding whether merging the first and second states would be advantageous. A determination is made, responsive to determining that merging the first state and the second state would not be advantageous for at least one variable in the set, not to merge the first state and the second state.

16 Claims, 8 Drawing Sheets

(56) References Cited

OTHER PUBLICATIONS

Boyer, R. S. et al., "SELECT—a formal system for testing and debugging programs by symbolic execution," In *Intl. Conf. on Reliable Software*, 1975, pp. 234-245.

Cadar, C. et al., "EXE: Automatically generating inputs of death," In *Conf. on Computer and Communication Security*, 2006, pp. 10:1-10:38.

Cadar, C. et al., "KLEE: Unassisted and automatic generation of high-coverage tests for complex systems programs," In *Symp. on Operating Sys. Design and Implem.*, 2008, pp. 1-16.

Chipounov, V. et al., "S2E: A platform for in-vivo multi-path analysis of software systems," In *Intl. Conf. on Architectural Support for Programming Languages and Operating Systems*, 2011, pp. 265-278.

Clarke, E. et al., "A tool for checking ANSI-C programs," In *Intl. Conf. on Tools and Algorithms for the Construction and Analysis of Systems*, 2004, pp. 168-176.

Das, M. et al., "ESP: Path-sensitive program verification in polynomial time," In *Intl. Conf. on Programming Language Design and Implem.*, 2002, 12 pages.

De Moura, L. et al., "Z3: An efficient SMT solver," In *Intl. Conf. on Tools and Algorithms for the Construction and Analysis of Systems*, 2008, 4 pages.

Dijkstra, E. W., "Guarded commands, nondeterminacy and formal derivation of programs," *Communications of the ACM*, 18(8):453-457, 1975.

Eén, N. et al., "An extensible SAT-solver," In *Intl. Conf. on Theory and Applications of Satisfiability Testing*, 2003, pp. 502-518.

Flanagan, C. et al., "Extended static checking for Java," In *Intl. Conf. on Programming Language Design and Implem.*, 2002, pp. 234-245.

Ganai, M. et al., "Tunneling and slicing: towards scalable BMC," In *Design Automation Conference*, 2008, pp. 137-142.

Ganesh, V. et al., "A decision procedure for bit-vectors and arrays," In *Intl. Conf. on Computer Aided Verification*, 2007, pp. 519-531.

Godefroid, P. "Compositional dynamic test generation (Extended Abstract)," In *Symp. on Principles of Programming Languages*, 2007, pp. 47-54.

Godefroid, P. et al., "Automatic partial loop summarization in dynamic test generation," In *Intl. Symp. on Software Testing and Analysis*, 2011, 11 pages.

Godefroid, P. et al., "Dart: Directed automated random testing," In *Intl. Conf. on Programming Language Design and Implem.*, 2005, pp. 213-223.

Godefroid, P. et al., "Automated whitebox fuzz testing," In *Network and Distributed System Security Symp.*, 2008, 16 pages.

Hansen, T. et al., "State joining and splitting for the symbolic execution of binaries," In *Intl. Conf. on Runtime Verification*, 2009, pp. 76-92.

Ivancic, F. et al., "F-soft: Software verification platform," In *Intl. Conf. on Computer Aided Verification*, 2005, pp. 301-306.

Ivancic, F. et al., "DC2: A framework for scalable, scope-bounded software verification," In *Intl. Conf. on Automated Software Engineering*, 2011, pp. 133-142.

King, J. C. "A new approach to program testing," In *Intl. Conf. on Reliable Software*, 1975, pp. 228-233.

Kuznetsov, V. et al., "Efficient State Merging in Symbolic Execution," PLDI '12, Proceedings of the $33^{rd}$ ACM SIGPLAN Conference on Programming Language Design and Implementation, ACM, 2012, pp. 193-204.

Lahiri, S. K. et al., "Back to the future: revisiting precise program verification using SMT solvers," In Symp. on Principles of Programming Languages, 2008, 16 pages.

Lattner, C. et al., "LLVM: A compilation framework for lifelong program analysis and transformation," In *Intl. Symp. on Code Generation and Optimization*, 2004, 12 pages.

Leino, K. R. M. et al., "A polymorphic intermediate verification language: Design and logical encoding," In *Intl. Conf. on Tools and Algorithms for the Construction and Analysis of Systems*, 2010, 15 pages.

Mauborgne, L. et al., "Trace partitioning in abstract interpretation based static analyzers," In *European Symp. on Programming*, 2005, pp. 5-20.

McMillan, K. L. "Lazy annotation for program testing and verification," In *Intl. Conf. on Computer Aided Verification*, 2010, pp. 104-118.

Sery, O. et al., "Interpolation-based function summaries in bounded model checking," In *HVC*, 2011, 15 pages.

Wheeler, D. "SLOCCount," 2010, 3 pages, [Online] [Retrieved on Aug. 1, 2012] Retrieved from the Internet<URL: http://www.dwheeler.com/sloccount/>.

Xie, Y. et al., "Scalable error detection using boolean satisfiability," In *Symp. on Principles of Programming Languages*, 2005, pp. 1-13.

\* cited by examiner

Input: Choice function *pickNext*, similarity relation $\sim$, branch checker *follow*, and initial location $\ell_0$.
Data: Worklist $w$ and set of successor states $S$.

1. $w := \{(\ell_0, \text{true}, \lambda v.v)\}$;
2. while $w \neq \varnothing$ do
3.      $(\ell, pc, s) := pickNext(w)$; $S := \varnothing$;
     // Symbolically execute the next instruction
4.      switch $instr(\ell)$ do
5.          case $v := e$                                // assignment
6.              $S := \{(succ(\ell), pc, s[v \mapsto \textbf{eval}(s, e)])\}$;
7.          case if$(e)$ goto $\ell'$            // conditional jump
8.              if $follow(pc \wedge s \wedge e)$ then
9.                  $S := \{(\ell', pc \wedge e, s)\}$;
10.              if $follow(pc \wedge s \wedge \neg e)$ then
11.                  $S := S \cup \{(succ(\ell), pc \wedge \neg e, s)\}$;
12.          case assert$(e)$                           // assertion
13.              if $isSatisfiable(pc \wedge s \wedge \neg e)$ then abort;
14.              else $S := \{(succ(\ell), pc, s)\}$;
15.          case halt                               // program halt
16.              print $pc$;

// Merge new states with matching ones in $w$
17.      forall $(\ell'', pc', s') \in S$ do
18.          if $\exists (\ell'', pc'', s'') \in w : (\ell'', pc'', s'') \sim (\ell'', pc', s')$ then
19.              $w := w \setminus \{(\ell'', pc'', s'')\}$;
20.              $w := w \cup \{(\ell'', pc' \vee pc'', \lambda v.\text{ite}(pc', s'[v], s''[v]))\}$;
21.          else
22.              $w := w \cup \{(\ell'', pc', s')\}$;

23. print "no errors";

FIG. 6

Input: Worklist $w$, choice functions $pickNext_D$ and $pickNext_F$, similarity relation $\sim$, trace function $pred$, threshold $\delta$
Data: Forwarding set $F$.
Result: The next state to execute.
// Determine the forwarding set
1   $F := \{a \in w \mid \exists a' \in w : \exists a'' \in pred(a', \delta) : a \sim a''\}$;
2   if $F \neq \varnothing$ then     // Choose a state from the forwarding set
3      |   return $pickNext_F(F)$
4   else                // Choose a state using the driving heuristic
5      |   return $pickNext_D(w)$

FIG. 7

```
1  void main(int argc, char **argv) {
2    int r = 1, arg = 1;
3    if (arg < argc)
4      if (strcmp(argv[arg], "-n") == 0) {
5        r = 0; ++arg;
6      }
7    for (; arg < argc; ++arg)
8      for (int i = 0; argv[arg][i] != 0; ++i)
9        putchar(argv[arg][i]);
10   if (r)
11     putchar('\n');
12 }
```

FIG. 8

ADVANTAGEOUS STATE MERGING DURING SYMBOLIC ANALYSIS

BACKGROUND

1. Technical Field

The invention generally relates to the field of symbolic analysis of a software program and in particular to advantageous state merging during symbolic analysis of a software program.

2. Background Information

Symbolic program analysis essentially performs forward expression substitution starting from a set of input variables. The resulting formulae are then used to falsify assertions and find bugs or to generate input assignments and generate test cases. One type of symbolic program analysis is symbolic execution. "Symbolic execution" refers to the execution of a software program using symbolic values instead of actual values. Instead of executing a target program with regular concrete inputs (e.g., x=5), symbolic execution executes a target program with "symbolic" inputs that can take on all values allowed by the type (e.g., x=λ, where λ∈N, and N is the set of all integer numbers). Whenever a conditional branch is encountered that involves a predicate π that depends (directly or indirectly) on x, both program state and execution are forked into two alternatives: one following the then-branch (π) and another following the else-branch ($\_,\pi$). The two executions can now be pursued independently. To ensure that only feasible paths are explored, a symbolic analysis engine (SAE) uses a constraint solver to check the satisfiability of each branch's predicate, and the SAE follows only satisfiable branches. This symbolic approach is efficient because it analyzes code for entire classes of inputs rather than specific ("concrete") inputs. Symbolic execution has been used to build automated test case generation tools and automated bug finding tools. Test generation by symbolic execution is just one of a multitude of precise symbolic program analyses that are facilitated by satisfiability constraint solvers.

A target software program is analyzed symbolically by an SAE. One of the challenges faced by conventional SAEs is scalability. The phenomenon of "path explosion" refers to the fact that the number of possible paths through a target program is roughly exponential in program size. A "state" in symbolic analysis encodes the history of branch decisions (the "path condition") and precisely characterizes the value of each variable in terms of input values (the "symbolic store"), so path explosion becomes synonymous with state explosion. The benefit of not having false positives in bug finding (save for over-approximate environment assumptions) comes at the cost of having to analyze an exponential number of states.

Given a target program, one way to reduce the number of states that a SAE needs to explore is to merge states that correspond to different paths through the target program. State merging effectively decreases the number of paths that have to be explored but also increases the size of the symbolic expressions describing variables. Merging introduces disjunctions into the path condition, which are notoriously difficult for constraint solvers. Merging also converts differing concrete values into a symbolic expression. If that symbolic expression were to appear in branch conditions or array indices later in the analysis, the choice of merging the states may lead to more constraint solver invocations than without merging. This combination of larger symbolic expressions (and larger symbolic path conditions) and extra solver invocations can outweigh the benefit of having fewer states to analyze.

State merging also conflicts with optimizations in the symbolic analysis exploration process. Search-based SAEs, like the ones used in test case generators and bug finding tools, employ search strategies to prioritize searching of "interesting" paths over "less interesting" ones (e.g., with respect to maximizing line coverage given a fixed time budget). To maximize the opportunities for state merging, however, the SAE would have to traverse the control flow graph in topological order, which typically contradicts the search strategy's path prioritization policy.

The net effect is that state merging may actually be detrimental (e.g., by decreasing overall symbolic analysis performance) rather than advantageous (e.g., by increasing overall symbolic analysis performance).

SUMMARY

The above and other issues are addressed by a computer-implemented method, non-transitory computer-readable storage medium, and computer system for determining whether to merge two symbolic analysis states, wherein a first state corresponds to a first path through a target program to a target program location, and wherein a second state corresponds to a second path through the target program to the target program location, and wherein the first path differs from the second path. An embodiment of the method comprises determining a set of one or more variables of the target program at the target program location. The method further comprises, for each variable in the set, determining a first value of the variable in the first state, wherein the first value is either a first concrete or a symbolic value; determining a second value of the variable in the second state, wherein the second value is either a second concrete value or a symbolic value; and determining, based on the first value and the second value, whether merging the first state and the second state would be advantageous. The method further comprises, responsive to determining that merging the first state and the second state would not be advantageous for at least one variable in the set, determining not to merge the first state and the second state.

An embodiment of the medium stores executable computer program instructions for determining whether to merge two symbolic analysis states, wherein a first state corresponds to a first path through a target program to a target program location, and wherein a second state corresponds to a second path through the target program to the target program location, and wherein the first path differs from the second path. The instructions determine a set of one or more variables of the target program at the target program location. The instructions further, for each variable in the set, determine a first value of the variable in the first state, wherein the first value is either a first concrete value or a symbolic value; determine a second value of the variable in the second state, wherein the second value is either a second concrete value or a symbolic value; and determine, based on the first value and the second value, whether merging the first state and the second state would be advantageous. The instructions further determine, responsive to determining that merging the first state and the second state would not be advantageous for at least one variable in the set, not to merge the first state and the second state.

An embodiment of the computer system for determining whether to merge two symbolic analysis states, wherein a first state corresponds to a first path through a target program to a target program location, and wherein a second state corresponds to a second path through the target program to the target program location, and wherein the first path differs from the second path, comprises at least one non-transitory computer-readable storage medium storing executable computer program instructions. The instructions comprise instructions for determining a set of one or more variables of the target program at the target program location. The instructions further, for each variable in the set, determine a first value of the variable in the first state, wherein the first value is either a first concrete value or a symbolic value; determine a second value of the variable in the second state, wherein the second value is either a second concrete value or a symbolic value; and determine, based on the first value and the second value, whether merging the first state and the second state would be advantageous. The instructions further determine, responsive to determining that merging the first state and the second state would not be advantageous for at least one variable in the set, not to merge the first state and the second state.

BRIEF DESCRIPTION OF THE DRAWINGS

FIG. 6 is a listing of pseudocode illustrating generic symbolic exploration according to one embodiment.

FIG. 7 is a listing of pseudocode illustrating a pickNext method for dynamic state merging according to one embodiment.

FIG. 8 is a listing of pseudocode illustrating a simplified version of the echo program according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that, wherever practicable, similar or like reference numbers may be used in the figures and may indicate similar or like functionality.

Figure 1:
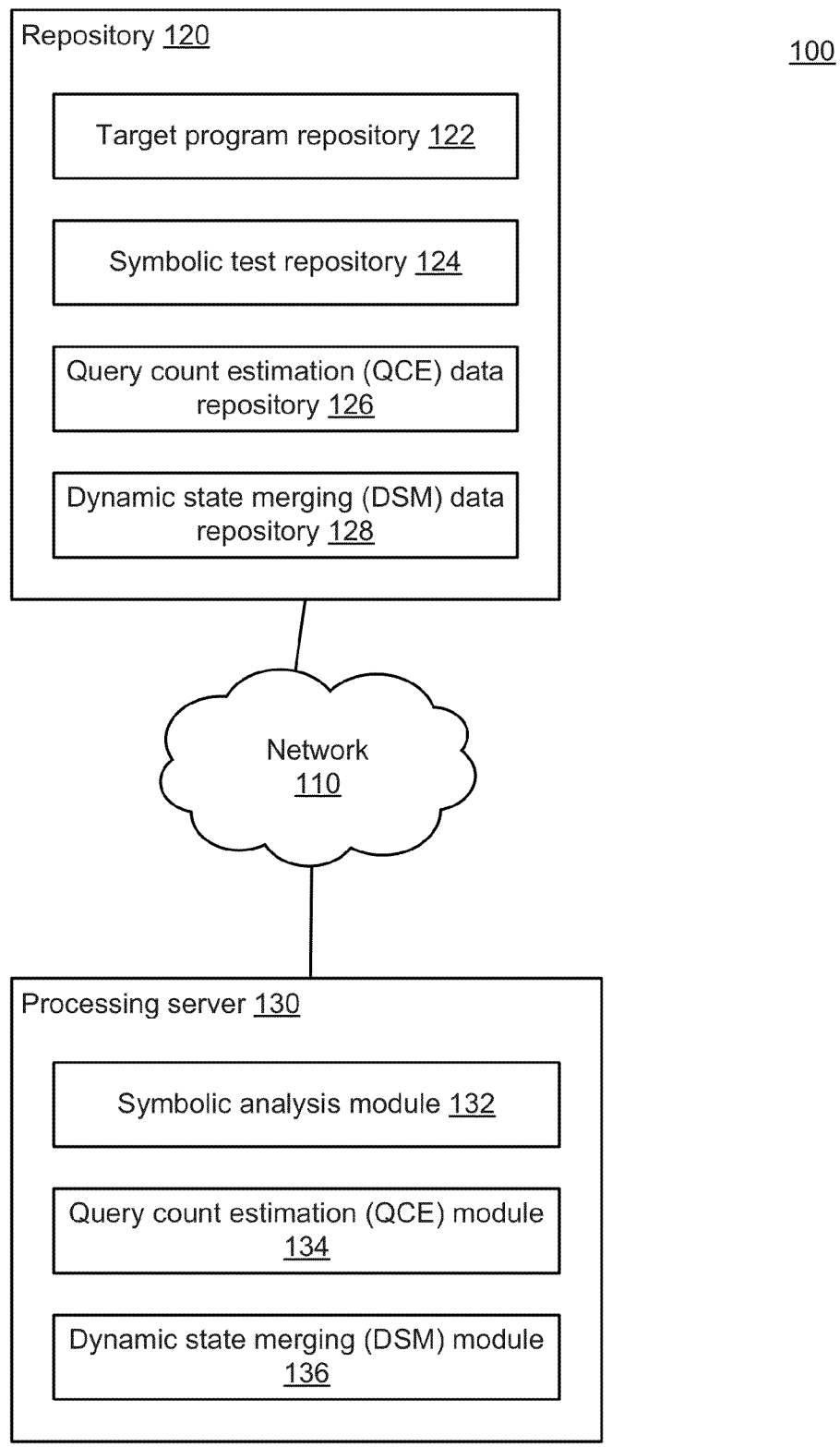
FIG. 1 is a high-level block diagram illustrating an environment for advantageous state merging during symbolic analysis of a target program according to one embodiment.

FIG. 1 is a high-level block diagram illustrating an environment 100 for advantageous state merging during symbolic analysis of a target program according to one embodiment. The environment 100 symbolically analyzes a target program according to a symbolic test. During this symbolic analysis, states are advantageously merged (e.g., such that overall performance of the symbolic analysis is increased relative to symbolic analysis without state merging). For example, the environment 100 automatically determines when and how to merge states such that the performance of the symbolic analysis is increased. The environment 100 addresses the following challenges of state merging: a) larger symbolic expressions and extra constraint solver invocations and b) conflicts with optimizations in the symbolic analysis exploration process in such a way that yields a net benefit in practice. In one embodiment, the environment 100 finds a beneficial compromise between the state-space-reduction benefits of merged exploration and the constraint-solving benefits and search heuristic flexibility of unmerged per-path exploration.

The environment 100 may be maintained by an enterprise that facilitates symbolic analysis of software, such as a corporation, university, or government agency. As shown, the environment 100 includes a network 110, a repository 120, and a processing server 130. While only one repository 120 is shown the embodiment depicted in FIG. 1 for clarity, other embodiments can have multiple repositories 120. Also, while only one processing server 130 is shown in the embodiment depicted in FIG. 1 for clarity, other embodiments can have multiple processing servers 130.

The network 110 represents the communication pathway between the repository 120 and the processing server 130. In one embodiment, the network 110 uses standard communications technologies and/or protocols and can include the Internet. Thus, the network 110 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc.

The entities on the network 110 can use custom and/or dedicated data communications technologies instead of, or in addition to, the ones described above. Custom and/or dedicated data communications technologies include, for example, shared memory, shared storage (e.g., a shared storage server), and a cloud-based server. In one embodiment, some or all of the entities on the network 110 are located on the same machine and/or are part of the same program. In this embodiment, the network 110 includes a memory bus that links the various entities that are located on the same machine and/or are part of the same program.

The repository 120 is a computer (or set of computers) that stores a target program repository 122, a symbolic test repository 124, a query count estimation (QCE) data repository 126, and a dynamic state merging (DSM) data repository 128. In one embodiment, the repository 120 includes a server that provides the processing server 130 access to the target program repository 122, symbolic test repository 124, QCE data repository 126, and DSM data repository 128 in response to requests.

The target program repository 122 stores one or more target programs. In one embodiment, a target program is a software program. In other embodiments, a target program is a specification of an algorithm in a non-programming language or a specification of a hardware device or a chip in a specification language. These specifications can be verified using an SAE. The environment 100 enables a target program to be symbolically analyzed, during which states are advantageously merged. A target program can be single-threaded, multi-threaded, or distributed. A target program can be stored as executable code (e.g., native binary code) or as source code in a non-executable format. In one embodiment, a target program adheres to the LLVM low-level intermediate representation and compiler framework bitcode format.

The symbolic test repository 124 stores one or more symbolic tests. A symbolic test specifies families of program inputs for which to test a target program. The environment 100 enables a symbolic test to be applied to a target program. A symbolic test resembles a classic unit test in the sense that they are both code portions that exercise the functionality of a target program and check for some properties (e.g., through the use of assertions). A symbolic test differs from a classic unit test in various aspects: (1) A symbolic test uses a special API to mark parts of the target program input as symbolic or directly mark some or all internal variables of the program as symbolic (and thus allow multiple paths through the target program to be explored). (2) A symbolic test, together with the target program, executes inside a symbolic analysis engine (SAE), instead of being natively executed. (3) A symbolic test requires more resources than a classic unit test (e.g., a symbolic test executes for a longer period of time and requires larger computational power) and is often time-bounded.

A symbolic test is executed by a symbolic analysis module 132. In one embodiment, symbolic tests are written in the programming language of the target program and are executed as a suite (e.g., periodically, during and after the development phase). The resulting format of a symbolic test is specific to the SAE. A symbolic test can be stored as executable code (e.g., native binary code). In one embodiment, a symbolic test adheres to the LLVM format.

The query count estimation (QCE) data repository 126 stores calibration parameters used by a query count estimation (QCE) module 134 and "hot variables" generated by the QCE module 134. In one embodiment, some or all of the contents of the QCE data repository 126 are stored in memory along with the QCE module 134. In this embodiment, the QCE data repository 126 is similar to the short-term memory contents (as opposed to long-term storage contents) when the QCE module 134 is executed.

The values of the calibration parameters affect the amount of time spent symbolically exploring a target program. In one embodiment, the calibration parameters are denoted using the Greek letters alpha ($\alpha$), beta ($\beta$), and kappa ($\kappa$). The calibration parameter $\alpha$ controls how aggressively the QCE module 134 tries to merge states. The calibration parameter $\beta$ represents the probability that a particular branch of a conditional statement is feasible, independently of the other branch. In one embodiment, $0.5 < \beta < 1$. The calibration parameter $\kappa$ represents a bound on loop unrolling. Among the calibration parameters, the value of $\alpha$ has the highest impact on the running time.

Optimal values for the calibration parameters are difficult to compute analytically. However, for as given target program, one can empirically determine good parameter values using a simple hill-climbing method. In one embodiment, the parameter values are $\alpha = 10^{-12}$ and $\beta = 0.8$. Regarding $\kappa$, many loops with an input-dependent number of iterations actually iterate over program inputs. Therefore, in one embodiment $\kappa$ is set to 10, which corresponds to an average input size (e.g., an average number of program inputs). In one embodiment, the QCE data repository 126 stores values for calibration parameters alpha ($\alpha$), beta ($\beta$), and kappa ($\kappa$).

Besides storing calibration parameters used by the QCE module 134, the QCE data repository 126 also stores "hot variables" generated by the QCE module 134. A hot variable is a variable that is likely to cause many queries to a constraint solver if that variable were to contain a symbolic value. Specifically, at a program location l, a set H(l) includes variables that are hot at location l. In one embodiment, the QCE data repository 126 stores a set H(l) of hot variables for each location l in a target program. The QCE module 134 (specifically, the hot variables module 300) determines whether a particular variable v is hot at a particular location l.

The dynamic state merging (DSM) data repository 128 stores a "driving" heuristic used by a dynamic state merging (DSM) module 136, a search heuristic used by the DSM module 136, a threshold used by the DSM module 136, and a "reached-state history" generated by the DSM module 136. In one embodiment, some or all of the contents of the DSM data repository 128 are stored in memory along with the DSM module 136. In this embodiment, the DSM data repository 128 is similar to the memory contents when the DSM module 136 is executed.

The driving heuristic (given as a function pickNext$_D$) selects a state to explore next, according to the original goal of the exploration. One example of a driving heuristic is a random search heuristic, which selects execution paths randomly. Another example of a driving heuristic is a coverage-oriented search heuristic, which is biased toward covering previously unexplored program statements. A coverage-oriented search heuristic maximizes target program code line coverage given a fixed time budget and can be used to perform partial explorations aimed at obtaining statement coverage. Yet other examples of driving heuristics are a depth-first search heuristic and a breadth-first search heuristic, each of which can be used to perform complete exploration of the program paths.

The search heuristic (given as a function pickNext$_F$) also selects a state to explore next, but in a manner different from the driving heuristic. According to the function pickNext$_F$, the state is selected from a set F. States in F are likely to be mergeable after at most $\delta$ steps of execution and, therefore, have been selected for "fast-forwarding" (described below). The function pickNext$_F$ determines the execution order among the states in set F. In one embodiment, the first state from fast-forwarding set F is selected according to the topological order of the control flow graph. Thus, states that lie behind with respect to the topological order first catch up and are merged with later states. The function pickNext$_F$ is used when the set F is not empty, as explained below with reference to the search strategy module 410.

The threshold (referred to as $\delta$) refers to steps of execution. Specifically, states in F are likely to be mergeable after at most $\delta$ steps of execution.

Besides storing a driving heuristic used by the DSM module 136, a search heuristic used by the DSM module 136, and a threshold used by the DSM module 136, the DSM data repository 128 also stores a "reached-state history" generated by the DSM module 136. The reached-state history is a bounded history of the states in a worklist. In one embodiment, the reached-state history stores a precise history of reached states. In this precise history, a state is denoted by a triple (l,pc,s) that consists of a program location l, a path condition pc, and a symbolic store s that maps each internal program variable to either a concrete value or an expression over input variables. This triple denotes a state at location l that is reachable for inputs obeying path condition pc and in which the symbolic store $s=[v_0=e_0, \ldots, v_n=e_n]$ maps variable $v_i$ to expression $e_i$, respectively.

Storing a precise history of reached states can incur prohibitive space costs. In another embodiment, the space requirements of the reached-state history are reduced as follows: Since states from the history are used only for comparisons with respect to the similarity relation "~", it is required to store only the parts of the state that are relevant to the relation. Moreover, if the ~ relation is sensitive only to equality, then the reached-state history can store hash values of the relevant information from past states, and these hash values can then be compared.

Recall that states in F are likely to be mergeable after at most δ steps of execution. In the reached-state history hashing embodiment, determining whether a state belongs to F is implemented as a simple hash table lookup. Hash collisions do not pose a problem because a full check of the similarity relation is still performed when fast-forwarding finishes and the states are about to be merged. Moreover, the set F is rebuilt after each execution step, so, if a state was added to F due to a collision, it is unlikely to be added again to F in the next step, since a second collision for two different hash values has low probability.

The processing server 130 includes various modules such as a symbolic analysis module 132 for analyzing a target program according to a symbolic test, a query count estimation (QCE) module 134 for determining whether two states are sufficiently similar that merging them would yield a net benefit, and a dynamic state merging (DSM) module 136 for merging states while accommodating existing search strategies. In one embodiment, the processing server 130 includes a computer (or set of computers) that communicates with the repository 120 and processes data (e.g., by executing the symbolic analysis module 132, the QCE module 134, and the DSM module 136).

The symbolic analysis module 132 analyzes a target program symbolically. For example, the symbolic analysis module 132 symbolically analyzes the target program according to a symbolic test. In one embodiment, the symbolic analysis module 132 performs symbolic execution.

In one embodiment, the symbolic analysis module 132 operates according to a generic algorithm for symbolic program analysis that can be used to implement different analysis flavors. This algorithm is shown in FIG. 6. FIG. 6 is a listing of pseudocode illustrating generic symbolic exploration according to one embodiment. The pseudocode uses a simple input language with assignments, conditional goto statements, assertions, and halt statements. The algorithm in FIG. 6 is parameterized by a choice function pickNext for choosing the next state in the worklist, a branch checking function follow that returns a decision on whether to follow a branch, and a similarity relation "~" that controls whether states should be merged. In one embodiment, the choice function pickNext is implemented by the search strategy module 410 (discussed below). The branch checking function follow determines whether to follow a branch. Reasons not to follow a branch include, for example, the branch being infeasible or the branch exceeding a limit on loop unrolling. In one embodiment, the similarity relation ~ is implemented by the merging decision module 310 (discussed below).

In line 1 of the algorithm, the worklist w of the algorithm is initialized with a state whose symbolic store maps each variable to itself (for simplicity, named constants are excluded). "λx.e" denotes the function that maps parameter x to an expression e. "λ($x_1, \ldots, x_n$).e" is used for multiple parameters. In each iteration, the algorithm picks a new state from the worklist using pickNext (line 3). On encountering an assignment v:=e (lines 5-6), the algorithm creates a successor state at the fall-through successor location succ(l) of l by updating the symbolic store s with a mapping from v to a new symbolic expression obtained by evaluating e in the context of s, and adds the new state to the set S. At every branch (lines 7-11), the algorithm first checks whether to follow either path (using follow) and, if so, adds the corresponding condition to the successor state, which in turn is added to S. For assertions (line 12-14), the path condition, the symbolic store, and the negated assertion are put in conjunction and checked for satistiability. Since the algorithm does not overapproximate, this check has no false positives. Halt statements terminate the target program, so the algorithm just outputs the path condition, a satisfying assignment of which can be used to generate a test case for the execution leading to the halt.

In lines 17-22, the new states in S are then merged with any matching states in the worklist before being added to the worklist themselves. Two states match if they share the same location l and are similar according to ~. Merging creates a disjunction of the two path conditions (which can be simplified by factoring out common prefixes) and builds the merged symbolic store from ite (if-then-else) expressions that assert one or the other original value, depending on the path taken (line 20). The ite expressions that assert an identical value in both cases (because it was equal in both symbolic stores) can be simplified to that value.

In one embodiment, the symbolic analysis module 132 includes a symbolic analysis engine (SAE) based on the KLEE symbolic execution tool (specifically, KLEE's single-computing-node symbolic execution engine). KLEE was developed at Stanford University and built on top of the LLVM low-level intermediate representation and compiler framework. The KLEE symbolic execution engine takes as input a program in LLVM bitcode and a specification of which program inputs should be marked as symbolic for the analysis (e.g., command-line arguments or file contents). KLEE implements precise non-compositional symbolic execution with feasibility checks performed at every conditional branch. KLEE uses search strategies to guide exploration. The stock strategies include random search and a strategy biased toward covering previously unexplored program statements.

The query count estimation (QCE) module 134 determines whether two states are sufficiently similar that merging them would yield a net benefit. For example the QCE module 134 statically estimates the impact that a symbolic variable has on constraint solver queries that follow a potential merge point. In one embodiment, this impact is represented by the number of times that variable will appear in future solver queries after the potential merge point. An estimate of how many subsequent solver queries that variable is likely to be part of can be obtained by estimating how often that variable is used in branch conditions past any given point in the control flow graph. The QCE module 134 is thereby able to estimate how variables that are different in two potentially mergeable states will be used in the future.

In one embodiment, the QCE module 134 preprocesses the target program using a lightweight static analysis to estimate how often each variable is used in branch conditions past any given point in the control flow graph and uses this as a heuristic estimate of how many subsequent solver queries that variable is likely to be part of. States are then merged only when doing so promises to be advantageous. For example, two states are selectively merged only when differing variables are expected to appear infrequently in later solver queries. Since this selective merging merely groups paths instead of pruning them, inaccuracies in the estimation do not hurt soundness or completeness.

In this way, the QCE module 134 automatically identifies an advantageous balance between exploring fewer complex states versus exploring more simple states and merges states only when this promises to reduce exploration time. Specifically, a determination is made regarding whether two states are sufficiently similar that merging them would yield a net benefit. That is, the additional cost of solving more and harder constraint solver queries is outweighed by the savings from exploring fewer paths. The results of this static analysis affect only the completion time of the symbolic analysis—not its soundness or completeness. The QCE module 134 is further discussed below with reference to FIG. 3.

The dynamic state merging (DSM) module 136 merges states while accommodating existing search strategies. For example, the DSM module 136 beneficially combines state merging with search strategies in automated test case generation and bug finding tools (e.g., search strategies that deprioritize "non-interesting" execution paths). The DSM module 136 explores paths independently of each other and uses a similarity metric ~ to identify on-the-fly opportunities for merging, while preserving a search strategy's privilege of dictating exploration priorities. In one embodiment, the DSM module 136 dynamically identifies opportunities for merging regardless of the exploration order imposed by a search strategy. Operation of the DSM module 136 does not affect soundness or completeness of the symbolic analysis. The DSM module 136 is further discussed below with reference to FIG. 4.

Figure 2:
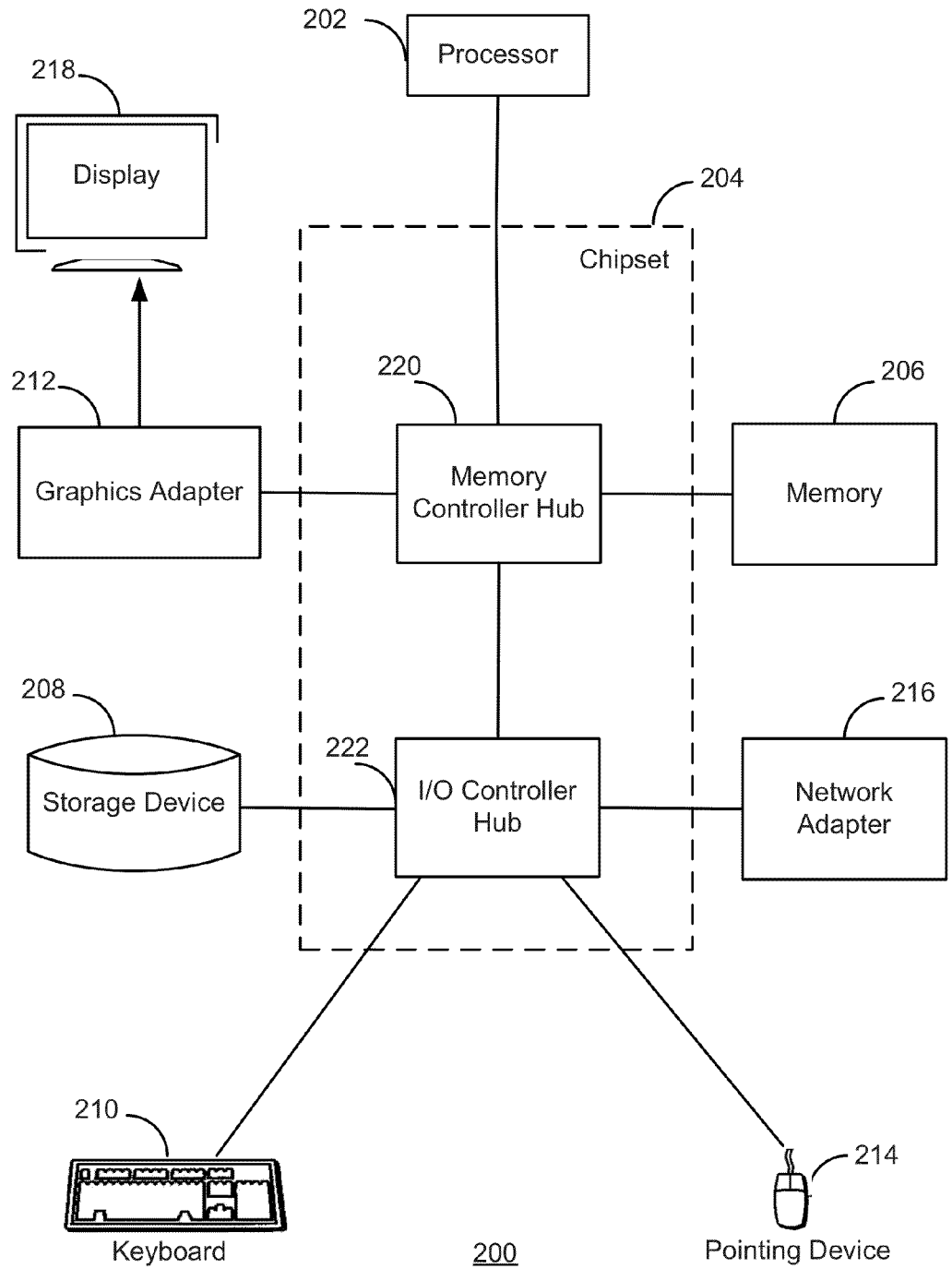
FIG. 2 is a high-level block diagram illustrating an example of a computer for use as one or more of the entities illustrated in FIG. 1, according to one embodiment.

FIG. 2 is a high-level block diagram illustrating an example of a computer for use as one or more of the entities illustrated in FIG. 1, according to one embodiment. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the repository 120 and/or the processing server 130 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
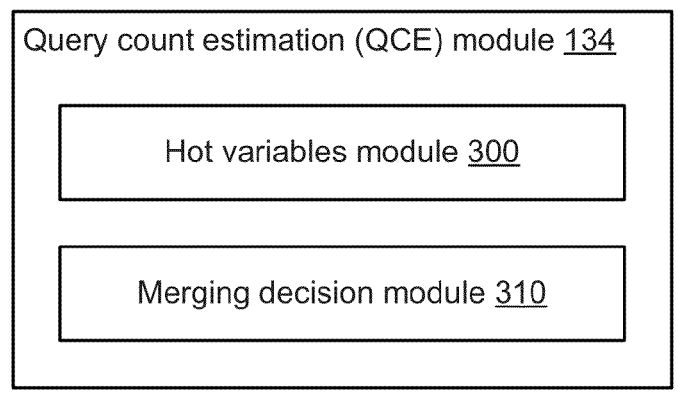
FIG. 3 is a high-level block diagram illustrating a detailed view of a query count estimation (QCE) module, according to one embodiment.

FIG. 3 is a high-level block diagram illustrating a detailed view of a query count estimation (QCE) module 134, according to one embodiment. The QCE module 134 includes a hot variables module 300 and a merging decision module 310. The hot variables module 300 determines whether a variable v is hot at a target program location l. The merging decision module 310 determines whether two states are sufficiently similar that merging them would yield a net benefit.

Recall that a "hot variable" is a variable that is likely to cause many queries to a constraint solver if that variable were to contain a symbolic value. The hot variables module 300 determines whether a variable v is hot at a target program location l and, if so, stores v in the QCE data repository 126 (as part of a set H(l) of variables that are hot at location l). In one embodiment, the hot variables module 300 makes this determination in two phases. The first phase involves static analysis, which occurs prior to symbolic analysis of the target program (i.e., prior to path exploration). The second phase involves dynamic analysis, which occurs during symbolic analysis of the target program (i.e., during path exploration).

To check whether a variable v is hot at location l, hot variables module 300 estimates the number of additional queries $Q_{add}(l,v)$ that would be executed after reaching l if variable v were to be made symbolic. Variable v is determined to be hot if this number is larger than a fixed fraction α of the total number of queries $Q_t(l)$ that will be executed after reaching l:

$$H(l)=\{v \in V | Q_{add}(l,v) > \alpha \cdot Q_t(l)\} \quad (1)$$

(Recall that α is one of the calibration parameters stored in the QCE data repository 126.) According to Equation (1), when α is ∞, no variables are determined to be hot, and the QCE module 134 allows all states to be merged. When α is 0, all variables are determined to be hot, and states that contain the same variable with different concrete values are never merged. Due to this property, α is referred to as the "QCE threshold parameter."

To estimate these numbers of queries efficiently, an assumption is made that every executed conditional branch leads to a constraint solver query with a fixed probability (which could be taken into account by suitably adjusting the value of α), and that each branch is feasible with a fixed probability β. (Recall that β is one of the calibration parameters stored in the QCE data repository 126.) Consider function q that descends recursively into the control flow graph counting the number of queries that are selected by a function c:

$$q(l',c) = \begin{cases} \beta \cdot q(succ(l'), c) + \beta \cdot q(l'', c) + c(l', e) & instr(l') = \text{if } (e) \text{ goto } l'' \\ 0 & instr(l') = \text{halt} \\ q(succ)(l'), c & \text{otherwise} \end{cases} \quad (2)$$

Then $Q_{add}(l,v)$ and $Q_t(l)$ can be computed recursively as follows:

$$Q_{add}(l,v) = q(l,\lambda(l',e) \cdot ite((l,v) \triangleleft (l',e),1,0))$$

$$Q_t(l) = q(l,\lambda(l',e) \cdot 1) \quad (3)$$

where $(l,v) \triangleleft (l',e)$ denotes the fact that expression e at location l' may depend on the value of variable v at location l, and where ite(c,p,q) denotes the if-then-else operator that evaluates to p if c is true, and to q otherwise. For the sake of simplicity, an assumption is made that all program loops are unrolled and all function calls are inlined. For loops (and recursive function calls) whose number of iterations cannot be determined statically, the hot variables module 300 assumes a fixed maximum number of iterations κ. (Recall that κ is one of the calibration parameters stored in the QCE data repository 126.)

Note that the hot variables module 300, as described above, estimates the number of additional queries without taking into account the fact that queries may become more expensive due to ite (if-then-else) expressions. In another embodiment, the hot variables module 300 estimates the number of additional queries and takes into account the fact that queries may become more expensive due to ite expressions. Appendix A describes how to take into account the cost of ite expressions.

The assumption of inlined functions is avoided by computing $Q_{add}(l,v)$ and $Q_t(l)$ for all function entry points l as function summaries. This is performed compositionally, by computing per-function local query counts in a bottom-up fashion. The local query counts for a function F include all queries issued inside F and all functions called by F. To compute these, Equation (2) is extended to handle function calls. At every call site, the local query counts are incremented by the local query counts at the entry point of the callee. At this point, the first phase of the hot variables determination (static analysis, which occurs prior to symbolic analysis) ends.

Since the local query counts do not include queries issued after the function returns to the caller (this would require context-sensitive local query counts), the last step of the computation is performed dynamically during symbolic analysis. During the second phase of the hot variables determination (dynamic analysis, which occurs during symbolic analysis), the global query counts are obtained by adding the local query counts at the location of the current state to the sum of the local query counts of all return locations in the call stack.

In one embodiment, the hot variables module 300 is implemented by extending KLEE to perform a static analysis of the target program (e.g., LLVM bitcode) to compute local query count estimates. The static analysis is executed before the symbolic analysis (which includes the path exploration) and annotates each target program location with the corresponding query count estimates $Q_t(l)$ and $Q_{add}(l,v)$. The pass is implemented as an LLVM per-function bottom-up call graph traversal (with bounded recursion) and performs the analysis compositionally. When analyzing each function, the pass attempts to statically determine trip counts (number of iterations) for loops. If the pass cannot do this, the pass approximates the trip counts with the loop bound parameter κ. The analysis tracks the query count for local variables, function arguments, and in-memory variables indexed by a constant offset and pointed to by either a local variable, a function argument, or a global variable. Data dependencies between variables are checked by traversing the program in static single assignment (SSA) form. Since LLVM's SSA form handles only local variables, dependencies between in-memory variables are not tracked except when loading them to locals. Regarding the second phase of the hot variables determination, KLEE is modified to compute interprocedural query counts and sets of hot variables H(l) dynamically during symbolic analysis.

The merging decision module 310 determines whether two states are sufficiently similar that merging them would yield a net benefit. To make an exact merging decision, one would have to compute the cumulative constraint solving times for both the merged and unmerged cases. Since this is impractical, the merging decision module 310 makes several simplifications that allow constraint solving times to be largely pre-computed before symbolic analysis begins.

At each program location l, the hot variables module 300 computes a set H(l) of "hot variables" that are likely to cause many queries to the constraint solver if they were to contain symbolic values. In one embodiment, where compositional analysis is not used, the hot variables module 300 computes the set H(l) dynamically, during symbolic analysis. In another embodiment, where compositional analysis is used, the hot variables module 300 pre-computes local per-variable query counts but computes the set H(l) dynamically, during symbolic analysis. The merging decision module 310 avoids introducing new symbolic values for these "hot variables." Specifically, the merging decision module 310 merges states only if every hot variable either has the same concrete value in both states or is already symbolic in at least one of the states. Formally, the merging decision module 310 operates according to the similarity relation ~ of the algorithm in FIG. 6, which is defined as:

$$(l,pc_1,s_1) \sim_{qce} (l,pc_2,s_2) \Leftrightarrow \forall v \in H(l): s_1[v] = s_2[v] \vee I \blacktriangleleft s_1[v] \blacktriangleleft I \vee s_2[v] \quad (4)$$

where $I \blacktriangleleft s[v]$ denotes that variable v has a symbolic value in the symbolic store s (i.e., it depends on the set of symbolic inputs I).

The relation $\sim_{qce}$ can be modified to check for equality only, as required for hashing in the reached-state history. The condition for variables to be either symbolic or equal in Equation (4) is expressed by $h(s_1[v])=h(s_2[v])$, where $h(v)=ite(I \blacktriangleleft v, *, v)$ filters out symbolic variables by mapping them to a unique special value. The reached-state history can thus store just the hash value of $\cup_{v \in H(l)} h(v)$ for a state. Then, $\sim_{qce}$ can be checked by comparing the hash values of the two states (modulo hash collisions).

Figure 9:
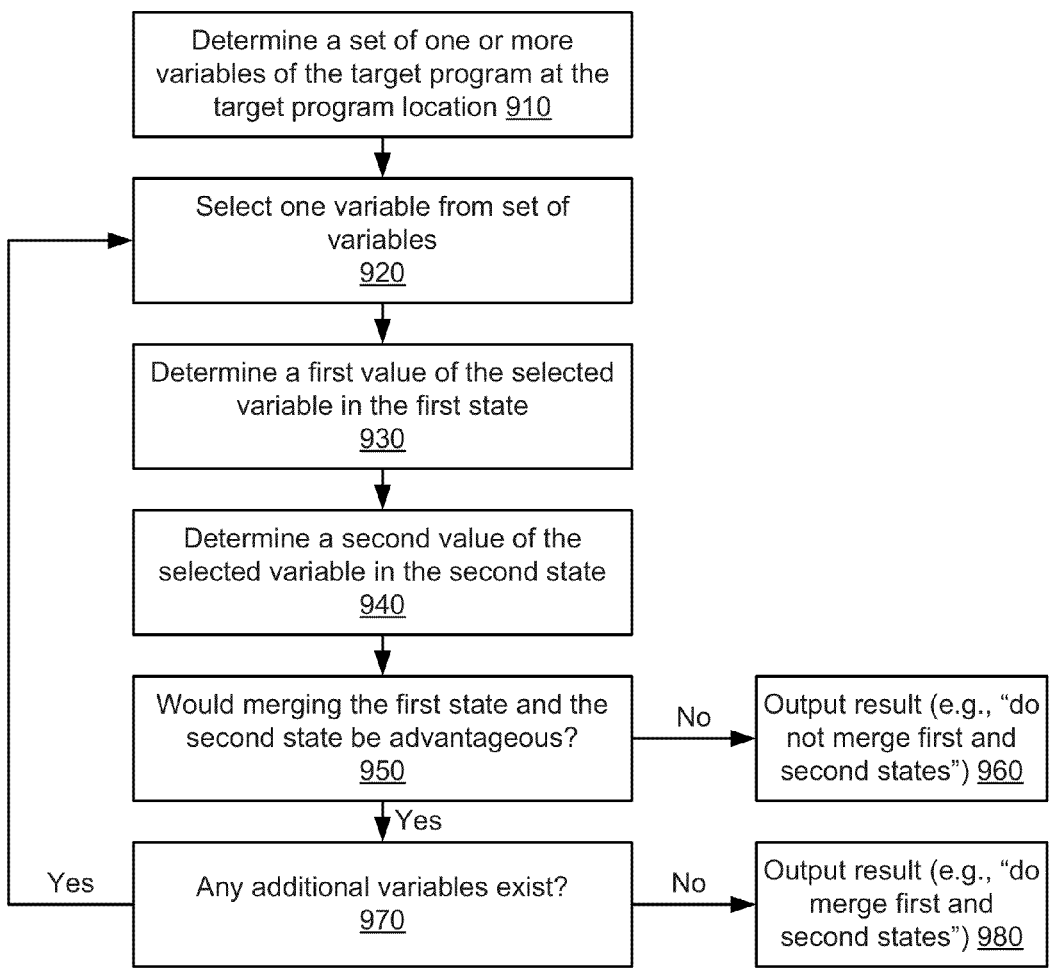
FIG. 9 is a flowchart illustrating a method of determining whether to merge two symbolic analysis states according to one embodiment.

FIG. 9 is a flowchart illustrating a method 900 of determining whether to merge two symbolic analysis states according to one embodiment. Other embodiments can perform the steps in different orders and can include different and/or additional steps. In addition, some or all of the steps can be performed by entities other than those shown in FIGS. 1 and 3.

When the method 900 starts, two symbolic analysis states have already been identified. The first state corresponds to a first path through a target program to a target program location. The second state corresponds to a second path through the same target program to the same target program location. The first path differs from the second path. At this point, the method 900 begins.

In step 910, a set of one or more variables of the target program at the target program location is determined. For example, the hot variables module 300 determines one or more variables that are likely to cause many queries to a constraint solver if those variables were to contain symbolic values. These variables are placed in the set.

In step 920, one variable is selected from the set of variables determined in step 910.

In step 930, a first value of the selected variable in the first state is determined. For example, the value of the variable is obtained from the symbolic store portion of the first state. The first value is either a first concrete value or a symbolic value.

In step 940, a second value of the selected variable in the second state is determined. For example, the value of the variable is obtained from the symbolic store portion of the second state. The second value is either a second concrete value or a symbolic value In step 950, a determination is made regarding whether merging the first state and the second state would be advantageous. In one embodiment, this determination is made based on the first value (determined in step 930) and the second value (determined in step 940). For example, the merging decision module 310 makes this determination such that merging is advantageous if the variable either has the same concrete value in both states or is already symbolic in at least one of the states.

If merging the first state and the second state would not be advantageous, then the method proceeds to step 960. In step 960, a determination result is output (e.g., "do not merge the first and second states").

If merging the first state and the second state would be advantageous, then the method proceeds to step 970. In step 970, a determination is made regarding whether any additional variables exist (specifically, whether any additional variables exist that are in the set of variables but have not yet been evaluated with respect to step 950). If any additional variables do exist, then the method returns to step 920, where an additional variable is selected. If no additional variables exist, then the method proceeds to step 980, where a result is output (e.g., "do merge the first and second states").

Appendix B includes an example of how the merging decision module 310 determines whether to merge states.

Figure 4:
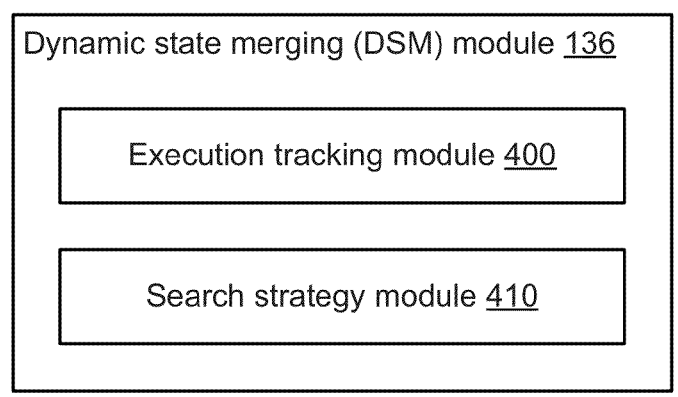
FIG. 4 is a high-level block diagram illustrating a detailed view of a dynamic state merging (DSM) module, according to one embodiment.

FIG. 4 is a high-level block diagram illustrating a detailed view of a dynamic state merging (DSM) module 136, according to one embodiment. The DSM module 136 includes an execution tracking module 400 and a search strategy module 410. The execution tracking module 400 generates a reached-state history. The search strategy module 410 selects a next state to execute.

Dynamic state merging (DSM) does not require states to share the same program location in order to be considered for merging. The rationale behind DSM is the following: Consider two abstract states $\alpha_1=(l_1,pc_1,s_1)$ and $\alpha_2=(l_2,pc_2,s_2)$, with $l_1 \neq l_2$, that are both in the worklist. Assume that $\alpha'_1$, one of the transitive successors of $\alpha_1$ (which have not been computed yet) will reach location $l_2$. Provided that the number of steps required to reach $l_2$ from $\alpha_1$ is small, and the expected similarity of $\alpha'_1$ and $\alpha_2$ is high, enough that merging them will be beneficial, it is worth overriding a coverage-oriented search strategy to compute $\alpha'_1$ next and to then merge it with $\alpha_2$. This override is referred to as fast-forwarding because $\alpha_1$ is forwarded to $\alpha_2$'s location with temporary priority before resuming the regular search strategy.

To determine whether $\alpha_1$ can be expected to be similar to $\alpha_2$ in the near future, a determination is made regarding whether $\alpha_1$ could have been merged with a predecessor $\alpha'_2$ of $\alpha_2$, i.e., whether $\alpha_1 \sim \alpha'_2$. The underlying expectation is that if two states are similar, then their two respective successors after a few steps of execution are also likely (but not guaranteed) to be similar.

Note that fast-forwarding deals with special cases automatically. If a state forks while being fast-forwarded, all children that are still similar to a recent predecessor of a state in the worklist are fast-forwarded. If a state leaves the path taken by the state it is similar to, i.e., fast-forwarding diverges, the state is no longer similar to any predecessor and is thus no longer prioritized.

Without any restrictions on the search strategy, only states that meet at the same program location by chance could ever be merged. To increase the opportunities for merging, the execution tracking module 400 maintains a bounded history of the predecessors of the states in the worklist (the reached-state history stored in the DSM data repository 128). When picking the next state to process from the worklist, the search strategy module 410 determines whether some state $\alpha_1$ is similar to a predecessor $\alpha'_2$ of another state $\alpha_2$ in the worklist. If yes, then state $\alpha_1$, which is in some sense lagging behind $\alpha_2$, is prioritized over the other states. This causes state $\alpha_1$ to be temporarily fast-forwarded, until its own successor matches up with the candidate-for-merging state $\alpha_2$. If the state diverges, i.e., one of $\alpha_1$'s successors is no longer sufficiently similar to a predecessor of $\alpha_2$, the merge attempt is abandoned. Thus, while the search strategy is still in control, the search strategy module 410 identifies merge opportunities dynamically within a fixed distance and only briefly takes over control to attempt the merge. After the merge attempt, the search strategy continues as before.

The execution tracking module 400 generates a reached-state history and stores it in the DSM data repository 128. Recall that a reached-state history is a bounded history of the predecessors of the states in a worklist and that states in F are likely to be mergeable after at most δ steps of execution. A function pred($\alpha$,δ) computes the set of predecessors of $\alpha$ within a distance of δ. The function can be defined as pred($\alpha$, δ)={a'|∃n≤δ:$\alpha \epsilon$post$^n$(a')}, where post(a') denotes the set of immediate successor states S for a state a' computed by the algorithm in FIG. 6. Recall that, if the ~ relation is sensitive only to equality, then the reached-state history can store hash values of the relevant information from past states. In one embodiment, the execution tracking module 400 incrementally computes these state hashes.

In one embodiment, the search strategy module 410 operates according to an algorithm for dynamic state merging. This algorithm is shown in FIG. 7. FIG. 7 is a listing of pseudocode illustrating a pickNext method for dynamic state merging according to one embodiment. (Recall that the algorithm in FIG. 6 is parameterized by the function pickNext for choosing the next state in the worklist.)

The pickNext function in FIG. 7 is parameterized by a first choice function pickNext$_D$, a second choice function pickNext$_F$, a similarity relation ~, a trace function pred, and a threshold 6. The choice functions pickNext$_D$ and pickNext$_F$ and the threshold δ are stored in the DSM data repository 128. The similarity relation ~ is implemented by the merging decision module 310. The trace function pred was discussed above with reference to the execution tracking module 400.

The pickNext function in FIG. 7 generally selects a next state to execute according to the choice function pickNext$_D$. However, when the pickNext function detects that some states, computed as a set F, are likely to be mergeable after at most δ steps of execution, the pickNext function overrides the choice function pickNext$_D$ and selects the next state to execute from F according to the choice function pickNext$_F$. In other words, the pickNext function returns a state from the fast-forwarding set of states F (pickNext$_F$) or, if this set is empty, the pickNext function resorts to the underlying driving heuristic to select a state from the general worklist w (pickNext$_D$).

In one embodiment, the search strategy module 410 is implemented in the form of a search strategy layer in KLEE's stacked strategy system. In KLEE's stacked strategy system, each "regular" strategy uses its own logic to select a state from the worklist but can rely on an underlying strategy whenever it has to make a choice among a set of equally important states. Here, the pickNext function replaces KLEE's regular strategy, and the pickNext$_D$ and pickNext$_F$ functions replace KLEE's underlying strategies. So, to select a next state, KLEE calls pickNext. pickNext then uses either pickNext$_D$ or pickNext$_F$ as an underlying strategy as described above.

Figure 10:
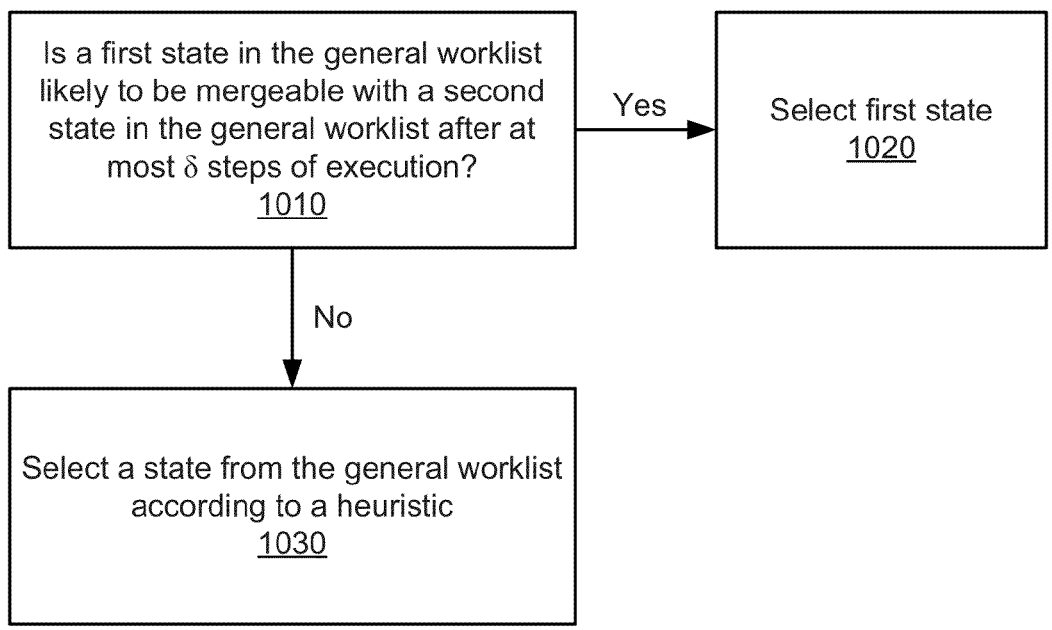
FIG. 10 is a flowchart illustrating a method of selecting a symbolic analysis state from a general worklist according to one embodiment.

FIG. 10 is a flowchart illustrating a method 1000 of selecting a symbolic analysis state from a general worklist according to one embodiment. Other embodiments can perform the steps in different orders and can include different and/or additional steps. In addition, some or all of the steps can be performed by entities other than those shown in FIGS. 1 and 4.

When the method 1000 starts, a general worklist of symbolic analysis states has already been identified. Also, a threshold has been identified. The threshold (referred to as δ) refers to steps of execution. At this point, the method 1000 begins.

In step 1010, a determination is made regarding whether a first state in the general worklist is likely to be mergeable with a second state in the general worklist after at most δ steps of execution. For example, the search strategy module 410 makes this determination based on the contents of the reached-state history (stored in the DSM data repository 128).

If a first state in the general worklist is likely to be mergeable with a second state in the general worklist after at most δ steps of execution (e.g., the first state would be a member of the forwarding set F), then the method proceeds to step 1020. In step 1020, the first state is selected. For example, the search strategy module 410 selects a state from F according to the pickNext$_F$ function.

If no states in the general worklist are likely to be mergeable with a second state in the general worklist after at most δ steps of execution (e.g., the forwarding set F would be empty), then the method proceeds to step 1030. In step 1030, a state is selected from the genera worklist according to a heuristic. For example, the search strategy module 410 selects a state from the general worklist according to the pickNext$_D$ function.

Figure 5:
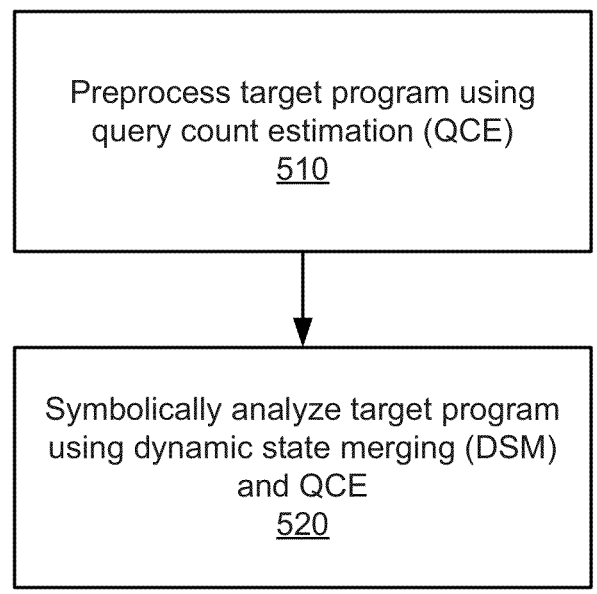
FIG. 5 is a flowchart illustrating a method for advantageous state merging during symbolic analysis of a target program according embodiment.

FIG. 5 is a flowchart illustrating a method 500 for advantageous state merging during symbolic analysis of a target program according to one embodiment. Before the method 500 starts, a target program is stored in the target program repository 122, a symbolic test is stored in the symbolic test repository 124, calibration parameters are stored in the QCE data repository 126, and a driving heuristic and a search heuristic are stored in the DSM data repository 128.

In step 510, a target program is preprocessed using query count estimation (QCE). For example, a target program is obtained from the target program repository 122. The hot variables module 300 performs the first phase of hot variable determination by statically analyzing the target program. For example, the hot variables module 300 determines query count estimates $Q_t(l)$ and $Q_{add}(l,v)$ for each target program location l and annotates each target program location l with the corresponding estimates.

In step 520, the target program is symbolically analyzed using dynamic state merging (DSM) and QCE. For example, a symbolic test is obtained from the symbolic test repository 124. The symbolic analysis module 132 symbolically analyzes the target program according to the symbolic test. As the target program is being analyzed, the search strategy module 410 executes to provide the pickNext function, which is used by the symbolic analysis module 132. Also, the merging decision module 310 executes to provide the similarity relation $\sim_{qce}$, which is used by the search strategy module 410. The execution tracking module 400 also executes as necessary to generate a reached-state history and store it in the DSM data repository 128. The hot variables module 300 also executes as necessary to determine whether a variable v is hot at a target program location l and, if so, store v in the QCE data repository 126.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

APPENDIX A

The design of QCE is now linked to a cost model through the successive application of live key simplifying assumptions. Since QCE is merely a heuristic and not a precise computation, the following only provides a justification for the reasoning behind it, but not a formal derivation. A full variant of QCE is explained that includes an estimate of the cost for introducing ite expressions.

An optimal heuristic for the similarity relation would compute whether the cumulative solving time $T_m$ for all descendants of the merged state is guaranteed to be less than the combined respective times $T_1$ and $T_2$ for the two individual states, i.e., whether $T_m < T_1 + T_2$. In the ideal case of merging two identical states, $T_m = T_1 = T_2$. Thus, merging just two states could theoretically cut the remaining exploration time in half. This is why, in principle, repeated merging can reduce the cumulative solving time by an exponential factor.

Precisely predicting the time required for solving a formula without actually solving it is generally impossible, therefore a first simplification is applied:

Simplifying Assumption 1.

A query takes one time unit to solve, Introducing new ite expressions into the query increases the cost to $\zeta > 1$ time units, where $\zeta$ is a parameter of the heuristic.

Thus, the estimated solving time is assumed to be linear in the number of queries of each type. In a further simplification, the number of queries that each one of two merge candidates would individually cause in the future is treated as equal:

Simplifying Assumption 2.

Two states at the same program location that are candidates for merging will cause the same number $Q_t$ of queries if they are explored separately.

This simplification is a prerequisite for statically computing query counts for a location in a way that is independent of the actual states during symbolic execution. The merged state then will also invoke these $Q_t$ queries, but some queries will take longer to solve due to introduced the expressions, and some additional queries become necessary. The number of queries into which merging introduces ite expressions is denoted by $Q_{ite}$ (with $Q_{ite} \leq Q_t$). The total cumulative cost of solving these queries is $\zeta \cdot Q_{ite}$ as per the first simplification. Additionally, the merged state can require extra solver invocations for queries corresponding to branch conditions that depend on constant but different values in the individual states (as in the loop conditions on lines 9 and 10 of FIG. 8). This number of additional queries is $Q_{add}$.

Note that the possible cost of introducing disjunctions into the path condition is ignored. In many common cases, the different conjuncts of the two path conditions are just negations of each other, and thus the disjunctive path condition can be simplified to the common prefix of the two individual path conditions.

With these simplifications, the total cost of solver queries in the merged state is $1 \cdot (Q_t - Q_{ite})$ for the remaining regular queries plus $\zeta \cdot Q_{ite}$ for queries involving new ite expressions, plus $1 \cdot Q_{add}$ for the additional queries. The criterion for performing a single merge can thus be formulated as $(Q_t - Q_{ite}) + \zeta \cdot Q_{ite} + Q_{add} < 2 \cdot Q_t$, which simplifies to $$(\zeta - 1) Q_{ite} - Q_{add} < Q_t. \qquad (5)$$

The values for $Q_t$, $Q_{ite}$, and $Q_{add}$ must be computed over the set of all feasible executions of the merged state. To statically estimate the feasibility of future paths, the following simplification is added:

Simplifying Assumption 3.

Each branch of a conditional statement is feasible with probability $0.5 < \beta < 1$, independently of the other branch.

The query counts can be estimated recursively. In the following definition, which is restated from (2), function $c(l',e)$ can be instantiated for $Q_t$, $Q_{ite}$, and $Q_{add}$ individually to return 1 if checking the feasibility of a branch condition e at location l' causes a query of the specific type (regular, involving ite expressions, or additional), or 0 otherwise:

$$q(l', c) = \begin{cases} \beta \cdot q(succ(l'), c) + \beta \cdot q(l'', c) + c(l', e) & instr(l') = \text{if } (e) \text{ goto } l'' \\ 0 & instr(l') = \text{halt} \\ q(succ(l'), c) & \text{otherwise} \end{cases} \quad (6)$$

For this definition, loop unrolling ensures that conditional statements in loops are counted as many times as the loop can execute. Loops and recursive calls with bounds that are not statically known are unrolled up to a fixed depth, given by the heuristic parameter $\mathcal{K}$. (Note that, for simplicity of exposition, only branch conditions are referred to here. In practice, other instructions, such as assertion checks or memory accesses with input-dependent offsets, will also trigger solver queries. In one embodiment, the definition of c is extended to account for these queries.)

The symbolic analysis engine issues a query whenever a state $(l,pc,s)$ encounters a branch with a conditional expression e that depends on program input, i.e., e evaluates to an expression $s[e]$ containing variables from the set of inputs I. This is denoted by $I \triangleleft s[e]$. To ease notation, the following shorthands are added: $s_1[v] \neq_s s_2[v] \stackrel{def}{\Longleftrightarrow} (I \triangleleft s_1[v] \vee I \triangleleft s_2[v]) \wedge s_1[v] \neq s_2[v]$ is used for the condition causing ite expressions, i.e., symbolic but non-equal variables in two states, and $s_1[v] \neq_c s_2[v] \stackrel{def}{\Longleftrightarrow} (I \triangleleft s_1[v] \vee I \triangleleft s_2[v]) \wedge s_1[v] \neq s_2[v]$ is used for the condition causing additional queries, concrete and non-equal variables in two states.

To define a function $c(l',e)$ for the different types of query counts, a method is needed to check whether the branch condition e depends on inputs when reached from one of the individual states. This is approximated statically using a path-insensitive data dependence analysis, and $(l,v) \triangleleft (l',e)$ is written if expression e at location l' may depend on the value of variable v at location l. Thus, the query counts can be defined as follows:

$Q_t((l,pc_1,s_1),(l,pc_2,s_2)) = q(l,\lambda(l',e)$.

$ite(\exists v: (I \triangleleft s_1[v] \vee I \triangleleft s_2[v]) \wedge (l,v) \triangleleft (l',e)),1,0)$ $Q_{ite}((l,pc_1,s_1),(l,pc_2,s_2)) = q(l,\lambda(l',e)$.

$ite(\exists v: s_1[v] \neq_s s_2[v] \wedge (l,v) \triangleleft (l',e)),1,0)$ $Q_{add}((l,pc_1,s_1),(l,pc_2,s_2)) = q(l,\lambda(l',e)$.

$ite(\exists v: s_1[v] \neq_c s_2[v] \wedge (l,v) \triangleleft (l',e)),1,0)$

Computing this recursive relation is expensive, and it cannot be pre-computed before symbolic execution because it requires determining which variables depend on program inputs in the states considered for merging. A fixed probability of input dependence is therefore assumed:

Simplifying Assumption 4.

The number of branches whose conditions are dependent on inputs is a fixed fraction $\phi$ of the total number of conditional branches.

This enables all variable dependencies to be eliminated from $Q_t$ and simplify $Q_t$ to $Q_t(l) = \phi \cdot q(l,\lambda(l',e).1)$. Now, $Q_t$ depends only on the program location and can thus be statically pre-computed.

$Q_{ite}$ and $Q_{add}$ count queries for which specific variable pairs are not equal in the two merge candidates. Therefore, $Q_{ite}$ and $Q_{add}$ would need to be statically pre-computed for each subset of variables that could be symbolic in either state during symbolic execution. To eliminate this dependency on the combination of specific variables, query counts for individual variables are computed. The per-variable query counts $Q_{ite}(l,v)$ and $Q_{add}(l,v)$ are defined as the value of $Q_{ite}(l)$ and $Q_{add}(l)$, respectively, computed as if v was the only variable that differs between the merge candidates. The per-variable query counts can be computed as $Q_{ite}(l,v) = Q_{add}(l,v) = q(l,\lambda(l',e) \cdot ite((l,v) \triangleleft (l'e),1,0))$.

Summing the per-variable query counts for all variables that differ between the merge candidates will grossly overestimate the actual values of $Q_{ite}$ and $Q_{add}$, since conditional expressions often depend on more than just one variable, and many queries would thus be counted multiple times. Similarly, using just the maximum per-variable query count would cause an under-estimation. In fact, $$\left\{v \in V \mid s_1[v] \neq_c s_2[v]\right\}^{max} Q_{add}(l,v) \leq Q_{add}(l) \leq \sum_{\{v \in V \mid s_1[v] \neq_c s_2[v]\}} Q_{add}(l,v)$$

and analogously for $Q_{ite}$. A final simplification is therefore made:

Simplifying Assumption 5.

Total query counts are equal to the variable query counts for an individual variable times some factor $\sigma$, i.e., $$Q_{ite}(l) \approx \sigma \cdot \left\{v \in V \mid s_1[v] \neq_s s_2[v]\right\}^{max} Q_{ite}(l,v)$$

$$Q_{add}(l) \approx \sigma \cdot \left\{v \in V \mid s_1[v] \neq_c s_2[v]\right\}^{max} Q_{add}(l,v).$$

The intuition behind this assumption is that the number of independent variables correlates with the input size and not with the total number of variables. Applying this substitution to Equation (5), the similarity relation $\sim_{qce}$ can now be defined as $$(l, pc_1, s_1) \sim_{qce} (l, pc_2, s_2) \stackrel{def}{\Longleftrightarrow} \quad (7)$$

$$(\zeta - 1)\left\{v \in V \mid s_1[v] \neq_s s_2[v]\right\}^{max} Q_{ite}(l,v) +$$

$$\left\{v \in V \mid s_1[v] \neq_c s_2[v]\right\}^{max} Q_{add}(l,v) < \frac{Q_t}{\sigma}$$

$Q_{ite}(l,v) = Q_{add}(l,v) = a(l,\lambda(l',e) \cdot ite((l,v) \triangleleft (l',e),1,0))$, $Q_t(l) = \phi \cdot q(l,\lambda(l',e).1)$, and recursively descending q as defined in Equation (6). For convenience, $\phi/\sigma$ is renamed to the unified parameter $\alpha$. Thus, $\alpha, \beta, \zeta$, and the unrolling bound $\mathcal{K}$ remain as the only parameters to QCE. The variant of QCE described above is derived from Equation (7) by removing $Q_{ite}$ from the criterion, to arrive at $$\left\{v \in V \,\Big|\, s_1[v] \stackrel{max}{\neq_c} s_2[v]\right\} Q_{add}(l, v) < \alpha Q_t,$$

which is equivalent to $$\forall v \in V : s_1[v] \neq_c s_2[v] \rightarrow Q_{add}(l,v) < \alpha Q_t.$$

To facilitate an efficient implementation in combination with dynamic state merging, a set of variables is collected that exceed the threshold $H_{add}(l) = \{v \in V | Q_{add}(v) > \alpha Q_t\}$ and the similarity relation is stated as (1).

This motivates the use of QCE for estimating the similarity of states.

APPENDIX B

FIG. 8 is a listing of pseudocode illustrating a simplified version of the echo program according to one embodiment. Consider the example program in FIG. 8, a simplified version of the UNIX echo utility that prints all its arguments to standard output, except for argument 0, which holds the program name. If the first regular argument is "−n", no newline character is appended. This program is analyzed using the algorithm in FIG. 6, assuming bounded input. Specifically, it is assumed that argc=N+1 for some constant N≥1, and that each of the N command-line arguments, pointed to by the corresponding element of argv, is a zero-terminated string of up to L characters. For simplicity, it is assumed that strcmp and putchar do not split paths. Under these preconditions, the total number of feasible program paths is $L^N + L^{N-1}$, and the branch condition at line 3 is always true.

The execution paths first split at line 4 on the condition C that argv[1] points to the string "−n". Line 6 is then reached by the two states (6,C, [r=0,arg=2]) and (6,¬ C, [r=1,arg=1]). These two can be merged into the single (but fully precise) state (6, true, [r=ite(C,0,1),arg=ite(C,2,1)]). Consider now the loop condition arg<argc in line 7. If the states were kept separate, this condition could be evaluated concretely in both states, as 1<N+1 and 2<N+1, respectively. In the merged state, however, the condition would become the disjunctive expression ite(C,2,1)<N+1, which now requires a constraint solver invocation where it was not previously necessary. The consequences of having merged at line 6 become even worse later in the execution, for the condition at line 8. The array index is no longer concrete, so the constraint solver is required to reason about symbolic memory accesses in the theory of arrays on every iteration of the nested loop. In this example, merging reduces the total number of states, but the merged state is more expensive to reason about. The total time required to fully explore all feasible paths in this program is significantly shorter if the paths are not merged on line 6.

Now consider the branching point in the inner loop header at line 8. Since this loop may be executed up to L times, each state that enters the loop creates L successor states, one for each loop exit possibility. For example, a state exiting after the second iteration is (8, ... Λ argv[1][0]≠0Λargv[1][1]=0, [ ... ; i=1]). On the next iteration of the outer loop (line 7), each of these L states again spawns L successors. At the end of the N outer loop iterations, there is a total of $L^N$ states. However, all of the states created in the loop at line 8 during the same iteration of the outer loop differ only in the value of the temporary variable i, which is never used again in the program. Therefore, merging these states does not increase the cost of subsequent feasibility checks, yet it cuts the number of states after the outer loop down to the number of states before the loop (2 in this example). Note that, while the path condition of the merged state is created as a disjunction, here it can be simplified to the common prefix of all path conditions.

There is another, less obvious, opportunity for merging states. Looking back at the first feasible branch at line 4, consider the state (7,C, [r=0,arg 1]), which corresponds to the path through the "then" branch, and the state (7,¬ C, [r=1, arg=1]), which corresponds to the path through the "else" branch and one first iteration over the outer loop. Merging these two states yields the state (7, true, [r=ite(C,0,1),arg=1]), which introduces a disjunction for the symbolic expression representing the value of the variable r. Unlike the arg variable discussed above, r is used only once on line 10, just before the program terminates. Therefore, the time saved by exploring the loops at lines 7-9 with fewer states can outweigh the cost of testing the more complex branch condition on line 10 in the merged state.

This example demonstrates that the net benefit of merging two states depends heavily on how often variables whose values differ between two states affect later branch conditions. This is a key insight behind QCE.

It is now illustrated how QCE can be used to decide whether to merge states at lines 6 and 7. The heuristic parameters α=0.5, β=0.6 and, to keep the example brief, $\mathcal{K}$=1 are used. First, $Q_t(7)$ and $Q_{add}(7,v)$ are pre-computed for $v \in \{r,arg\}$ using Equation (3). For brevity, the computation of $Q_{add}$ for argc, argv, and array contents referenced by argv is omitted. For
$Q_{add}(7,arg)$, we get
$Qadd(7,arg)=q(7,c)$ $=\beta q(8,c)+\beta q(10c)+c(7,arg<argc)=\beta q(8,c)+1$ $=\beta(\beta q(9,c)+\beta q(10,c)+c(8,argv[arg][i]\neq 0))+1$ $=\beta(\beta q(9,c)+1)+1=\beta(\beta q(10,c)+1)+1=\beta+1=1.6,$ where $c=\lambda(l',e)\cdot ite((7)arg)\triangleleft(l',e),1,0)$. Similarly, it is computed that $Q_{add}(7,r)=\beta+2\beta^2=1.32$ and $Q_t(7)=1+2\beta+2\beta^2=2.92$, according to Equation (1), H(7)={arg}. Since there are no branches between lines 6 and 7, H(6)=H(7)={arg}. Hence, in this example, the QCE similarity relation (4) allows the states at line 6 or 7 to be merged if the values of arg in the two states are either equal or symbolic. This is consistent with the results of the manual analysis above.

The invention claimed is:

1. A computer-implemented method of determining whether to merge two symbolic analysis states, wherein a first state corresponds to a first set of paths through a target program to a target program location, and a second state corresponds to a second set of paths through the target program to the target program location, the first set of paths differing from the second set of paths, the method comprising:
determining a set of one or more variables of the target program at the target program location;
analyzing values of each variable in the set to determine an impact of merging the first state and the second state, the analyzing comprising, for each variable in the set:
determining a first value of the variable in the first state, wherein the first value is either a first concrete value or a symbolic value;
determining a second value of the variable in the second state, wherein the second value is either a second concrete value or a symbolic value; and determining, based on the first value and the second value, whether merging the first state and the second state would be advantageous with regard to the variable,
  determining whether merging the first state and the second state would be advantageous comprising at least one of:
  responsive to the first value being a symbolic value or the second value being a symbolic value, determining that merging the first state and the second state would be advantageous with regard to the variable;
  responsive to the first value being a symbolic value or the second value being a symbolic value, determining that merging the first state and the second state would be advantageous with regard to the variable based on a comparison of the first value and the second value;
  responsive to the first value being a first concrete value and responsive to the second value being a second concrete value and responsive to the first concrete value and second concrete value being identical, determining that merging the first state and the second state would be advantageous with regard to the variable; and
  responsive to the first value being a first concrete value and responsive to the second value being a second concrete value and responsive to the first concrete value and second concrete value being different, determining that merging the first state and the second state would not be advantageous with regard to the variable;
determining, based on the analyzing of the values of each variable in the set, that, on balance, merging the first state and the second state will yield a net benefit, the net benefit comprising an overall reduction in time required to analyze the target program or an increase in a total number of program behaviors explored in a given time; and
responsive to determining that merging the first and second states will yield a net benefit, determining to merge the first state and the second state to produce a merged state, the merged state including all information corresponding to the first and second sets of paths that was included in the first and second states.

2. The computer-implemented method of claim 1, further comprising, responsive to determining that merging the first state and the second state would not be advantageous for all variables in the set, determining not to merge the first state and the second state.

3. The computer-implemented method of claim 1, wherein a variable in the set is likely to cause many queries to a constraint solver if that variable were to contain a symbolic value.

4. The computer-implemented method of claim 1, wherein determining the set of one or more variables comprises determining how many times a variable will appear in a constraint solver query that occurs after the target program location.

5. The computer-implemented method of claim 1, wherein determining the set of one or more variables comprises estimating how often a variable is used in a branch condition that occurs after the target program location.

6. A computer-implemented method of selecting a symbolic analysis state from a general worklist when analyzing a target program, the method comprising:
  predicting, based on a reached-state history, whether one or more states in the general worklist will be mergeable with another state in the general worklist after at most a predetermined number of steps of execution to yield a net benefit, the net benefit comprising an overall reduction in time required to analyze the target program or an increase in a total number of program behaviors explored in a given time;
  responsive to predicting that one or more states will be mergeable with another state after at most the predetermined number of steps of execution to yield a net benefit, selecting a first state from among the one or more states;
  responsive to predicting that no states in the general worklist will be mergeable after at most the predetermined number of steps of execution to yield a net benefit, selecting a state from the general worklist according to a heuristic; and
  determining whether merging the first state with a second state that is a predecessor state or a successor state of the corresponding another state would be advantageous, the determining comprising:
    analyzing values of each variable in a set of one or more variables of the target program to determine an impact of merging the first state and the second state, the analyzing comprising, for each variable in the set:
      determining a first value of the variable in the first state, wherein the first value is either a first concrete value or a symbolic value;
      determining a second value of the variable in the second state, wherein the second value is either a second concrete value or a symbolic value; and
      determining, based on the first value and the second value, whether merging the first state and the second state would be advantageous with regard to the variable, determining whether merging the first state and the second state would be advantageous comprising at least one of:
        responsive to the first value being a symbolic value or the second value being a symbolic value, determining that merging the first state and the second state would be advantageous with regard to the variable;
        responsive to the first value being a symbolic value or the second value being a symbolic value, determining that merging the first state and the second state would be advantageous with regard to the variable based on a comparison of the first value and the second value;
        responsive to the first value being a first concrete value and responsive to the second value being a second concrete value and responsive to the first concrete value and second concrete value being identical, determining that merging the first state and the second state would be advantageous with regard to the variable; and
        responsive to the first value being a first concrete value and responsive to the second value being a second concrete value and responsive to the first concrete value and second concrete value being different, determining that merging the first state and the second state would not be advantageous with regard to the variable;
    determining, based on the analyzing of the values of each variable in the set, that, on balance, merging the first state and the second state will yield a net benefit, the net benefit comprising an overall reduction in time required to analyze the target program or an increase in a total number of program behaviors explored in a given time; and responsive to determining that merging the first and second states will yield a net benefit, determining to merge the first state and the second state to produce a merged state, the merged state including all information corresponding to the first and second sets of paths that was included in the first and second states.

7. The computer-implemented method of claim 6, further comprising executing the selected state.

8. The computer-implemented method of claim 6, wherein the selected state corresponds to a first target program location, and the corresponding another state corresponds to a second target program location, and wherein the first target program location and the second target program location are different.

9. The computer-implemented method of claim 8, wherein predicting that the selected state will be mergeable with the corresponding another state after at most the predetermined number of steps of execution to yield a net benefit comprises:
determining that a successor state of the selected state will reach the second target program location within at most the predetermined number of steps of execution.

10. The computer-implemented method of claim 6, wherein the heuristic comprises a random search heuristic.

11. The computer-implemented method of claim 6, wherein the heuristic comprises a coverage-oriented search heuristic.

12. A non-transitory computer-readable storage medium storing executable computer program instructions for determining whether to merge two symbolic analysis states, wherein a first state corresponds to a first set of paths through a target program to a target program location, and a second state corresponds to a second set of paths through the target program to the target program location, the first set of paths differing from the second set of paths, the instructions performing steps comprising:
determining a set of one or more variables of the target program at the target program location;
analyzing values of each variable in the set to determine an impact of merging the first state and the second state, the analyzing comprising, for each variable in the set: determining a first value of the variable in the first state, wherein the first value is either a first concrete value or a symbolic value;
determining a second value of the variable in the second state, wherein the second value is either a second concrete value or a symbolic value; and
determining, based on the first value and the second value, whether merging the first state and the second state would be advantageous with regard to the variable,
determining whether merging the first state and the second state would be advantageous comprising at least one of:
responsive to the first value being a symbolic value or the second value being a symbolic value, determining that merging the first state and the second state would be advantageous with regard to the variable;
responsive to the first value being a symbolic value or the second value being a symbolic value, determining that merging the first state and the second state would be advantageous with regard to the variable based on a comparison of the first value and the second value;
responsive to the first value being a first concrete value and responsive to the second value being a second concrete value and responsive to the first concrete value and second concrete value being identical, determining that merging the first state and the second state would be advantageous with regard to the variable; and
responsive to the first value being a first concrete value and responsive to the second value being a second concrete value and responsive to the first concrete value and second concrete value being different, determining that merging the first state and the second state would not be advantageous with regard to the variable;
determining, based on the analyzing of the values of each variable in the set, that, on balance, merging the first state and the second state will yield a net benefit, the net benefit comprising an overall reduction in time required to analyze the target program or an increase in a total number of program behaviors explored in a given time; and
responsive to determining that merging the first and second states will yield a net benefit, determining to merge the first state and the second state to produce a merged state, the merged state including all information corresponding to the first and second sets of paths that was included in the first and second states.

13. A computer system for determining whether to merge two symbolic analysis states, wherein a first state corresponds to a first set of paths through a target program to a target program location, and a second state corresponds to a second set of paths through the target program to the target program location, the first set of paths differing from the second set of paths, the computer system comprising:
at least one non-transitory computer-readable storage medium storing executable computer program instructions comprising instructions for:
determining a set of one or more variables of the target program at the target program location;
analyzing values of each variable in the set to determine an impact of merging the first state and the second state, the analyzing comprising, for each variable in the set:
determining a first value of the variable in the first state, wherein the first value is either a first concrete value or a symbolic value;
determining a second value of the variable in the second state, wherein the second value is either a second concrete value or a symbolic value; and
determining, based on the first value and the second value, whether merging the first state and the second state would be advantageous with regard to the variable, determining whether merging the first state and the second state would be advantageous comprising at least one of:
responsive to the first value being a symbolic value or the second value being a symbolic value, determining that merging the first state and the second state would be advantageous with regard to the variable;
responsive to the first value being a symbolic value or the second value being a symbolic value, determining that merging the first state and the second state would be advantageous with regard to the variable based on a comparison of the first value and the second value;
responsive to the first value being a first concrete value and responsive to the second value being a second concrete value and responsive to the first concrete value and second concrete value being identical, determining that merging the first state and the second state would be advantageous with regard to the variable; and responsive to the first value being a first concrete value and responsive to the second value being a second concrete value and responsive to the first concrete value and second concrete value being different, determining that merging the first state and the second state would not be advantageous with regard to the variable, determining, based on the analyzing of the values of each variable in the set, that, on balance, merging the first state and the second state will yield a net benefit, the net benefit comprising an overall reduction in time required to analyze the target program or an increase in a total number of program behaviors explored in a given time; and responsive to determining that merging the first and second states will yield a net benefit, determining to merge the first state and the second state to produce a merged state, the merged state including all information corresponding to the first and second sets of paths that was included in the first and second states; and a processor for executing the computer program instructions.

14. The computer-implemented method of claim 1, wherein the first state and the second state are merged only if the analyzing determines that merging is advantageous for all variables in the set.

15. The non-transitory computer-readable storage medium of claim 12, wherein the first state and the second state are merged only if the analyzing determines that merging is advantageous for all variables in the set.

16. The computer system of claim 13, wherein the first state and the second state are merged only if the analyzing determines that merging is advantageous for all variables in the set.

* * * * *